UNITED STATES PATENT OFFICE.

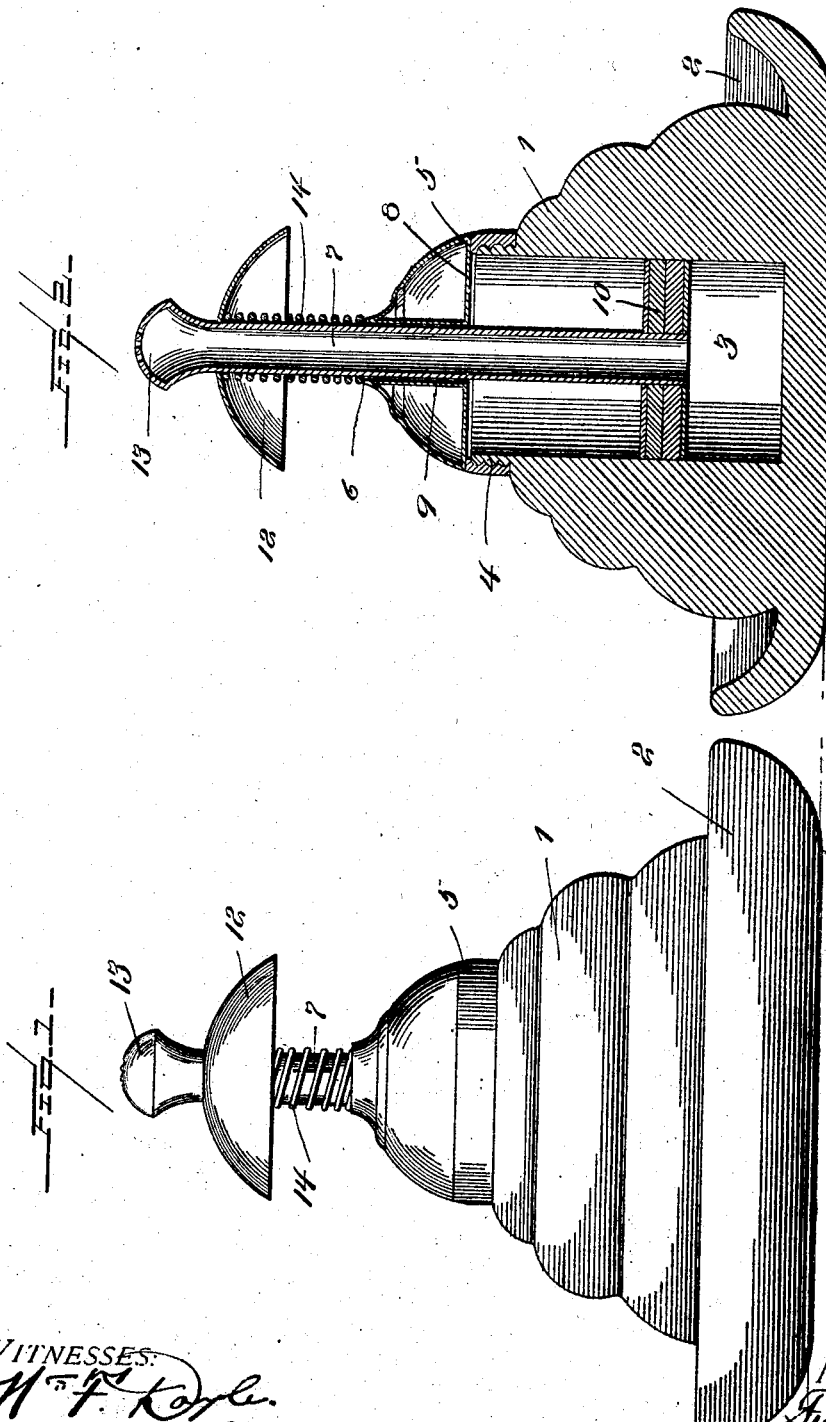

FRANK PFEIFER AND GEORGE RAYMOND, OF CHIPPEWA FALLS, WISCONSIN; SAID PFEIFER ASSIGNOR TO SAID RAYMOND.

DISPENSING VESSEL.

No. 805,994.   Specification of Letters Patent.   Patented Nov. 28, 1905.

Application filed April 12, 1905. Serial No. 255,246.

*To all whom it may concern:*

Be it known that we, FRANK PFEIFER and GEORGE RAYMOND, citizens of the United States, residing at Chippewa Falls, in the county of Chippewa and State of Wisconsin, have invented a new and useful Improvement in Dispensing Vessels, of which the following is a specification.

Our invention relates to dispensing bottles or vessels for toilet purposes; and the object thereof is to provide an arrangement, particularly for the use of barbers, whereby toilet waters or lotions may be discharged into the hand in small jets or sprays from a closed vessel without allowing the hand to come into contact with the contents of the vessel and to prevent the return of the jets or sprays of said contents into the vessel and for other purposes hereinafter disclosed.

To this end the invention includes the combination and arrangement of component parts to be hereinafter described, and particularly pointed out in the claims.

In the accompanying drawings, Figure 1 is a side view of a vessel equipped with the attachment for discharging liquid contents in jets or sprays, and Fig. 2 is a sectional view of the same.

The invention includes generally a liquid-containing bottle or vessel and a discharge-tube and a piston by means of which the contents are delivered from the vessel while in an upright position into the hand of the operator and a saucer integral with and surrounding the base of the vessel for catching the drip or waste.

Referring to the drawings, 1 indicates a vessel, preferably of conical contour, having an upwardly-disposed concave annular flange 2 surrounding it at its base. The vessel contains a cylindrical reservoir 3 open at the top, the mouth of which is exteriorly screw-threaded, as shown at 4. The cover of the vessel is designated by 5 and is interiorly screw-threaded to fit the thread 4 on the mouth of the reservoir 3. The said cover 5 tapers toward the top and at its apex is provided with the circular opening 6 to admit the discharge-tube 7, hereinafter described. The interior of the cover is provided with a disk-shaped lid adapted to fit snugly over the mouth of the vessel 1. This lid has a central circular aperture at 9 to admit the discharge-tube 7. The means for discharging the liquid contents of the vessel consists of the tube 7, leading through the opening in the top of the cover 5 and the aperture 9 in the lid 8 and carrying at its lower end a piston 10 within the cylindrical reservoir 3. The opposite end of said discharge-tube is furnished with an inverted hood 12, located beneath the flaring nozzle 13, adapted to form a handle for the depression of the discharge-tube and to shed the waste liquid over the opening in the top of the cover. The piston 10 is normally held in the top of the reservoir by the coil-spring 14, surrounding the discharge-tube, interposed between the top of the cover 5 and the hood 12 on the discharge-tube.

In the operation of the device the fingers and thumb of the operator are pressed on the hood 12, which depresses the discharge-tube 9 and piston 10 in the reservoir, which action discharges a jet or spray of the liquid contents through the tube into the hand of the operator. For the purpose of preventing the return of the drip or waste into the reservoir the hood 12 sheds same over the top of the bottle or vessel and allows it to drip into the annular flange 2 at its base. Upon the removal of the pressure upon the discharge-tube the same is returned to its normal position by the coil-spring 14.

The construction and operation of this invention will be readily understood upon reference to the foregoing description and the accompanying drawings, and it will be appreciated that the parts and combinations recited may be varied without departing from the spirit and scope thereof.

Having thus described our invention, what we claim as new, and desire to be secured by Letters Patent, is—

1. The combination with a conical-shaped vessel having an annular upwardly-disposed flange surrounding its base and a cylindrical liquid-containing reservoir therein, of a tapering cover having a disk-shaped lid therein, a tube carrying a piston on one end within said reservoir and an inverted hood on its opposite end, and a spring surrounding said tube interposed between the top of the cover and the inverted hood, substantially as and for the purposes described.

2. In a vessel of the class described, the combination with a conical-shaped vessel, having a liquid-containing reservoir therein, of a tapering cover and a disk-shaped lid closing said reservoir, a tube carrying a piston on one end within said reservoir and an inverted hood on its opposite end adapted to discharge the liquid contents of the vessel and shed the drip over the cover, and an annular upwardly-disposed flange surrounding the base of the vessel to catch the drip, substantially as described.

In testimony whereof we have signed our names to this specification in the presence of two subscribing witnesses.

FRANK PFEIFER.
GEORGE RAYMOND.

Witnesses:
J. A. ANDERSON,
MARY TOLAND.